(12) United States Patent
Milligan et al.

(10) Patent No.: US 7,842,738 B2
(45) Date of Patent: Nov. 30, 2010

(54) HIGH POLYMER CONTENT HYBRID DRAG REDUCERS

(75) Inventors: Stuart N. Milligan, Ponca City, OK (US); William F. Harris, Ponca City, OK (US); Timothy L. Burden, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 497 days.

(21) Appl. No.: 11/925,291

(22) Filed: Oct. 26, 2007

(65) Prior Publication Data

US 2009/0107554 A1    Apr. 30, 2009

(51) Int. Cl.
C09K 3/00 (2006.01)
(52) U.S. Cl. .................... 523/175; 523/220; 523/221
(58) Field of Classification Search ............... 523/175, 523/220, 221
See application file for complete search history.

(56) References Cited

U.S. PATENT DOCUMENTS

| | | | |
|---|---|---|---|
| 3,493,000 A | 2/1970 | Canevari et al. |
| 3,654,994 A | 4/1972 | Slagel et al. |
| 3,661,541 A | 5/1972 | Hollyday, Jr. |
| 3,679,582 A | 7/1972 | Wagenaar et al. |
| 3,726,653 A | 4/1973 | van der Meij et al. |
| 3,748,266 A | 7/1973 | Malone et al. |
| 3,758,406 A | 9/1973 | Malone et al. |
| 3,857,402 A | 12/1974 | Schuh |
| 3,985,703 A | 10/1976 | Ferry et al. |
| 4,190,069 A | 2/1980 | Krantz |
| 4,212,312 A | 7/1980 | Titus |
| 4,340,076 A | 7/1982 | Weitzen |
| 4,358,572 A | 11/1982 | Mack et al. |
| 4,546,784 A | 10/1985 | Schulz et al. |
| 4,573,488 A | 3/1986 | Carville et al. |
| 4,656,204 A | 4/1987 | Duvdevani et al. |
| 4,693,321 A | 9/1987 | Royer |
| 4,881,566 A | 11/1989 | Ubels et al. |
| 4,983,186 A | 1/1991 | Naiman et al. |
| 5,080,121 A | 1/1992 | Malik et al. |
| 5,244,937 A | 9/1993 | Lee et al. |
| 5,504,131 A | 4/1996 | Smith et al. |
| 5,504,132 A | 4/1996 | Smith et al. |
| 5,536,786 A | 7/1996 | Callahan, Jr. et al. |
| 5,928,830 A | 7/1999 | Cheng et al. |
| 6,015,779 A | 1/2000 | Eaton et al. |
| 6,126,872 A | 10/2000 | Kommareddi et al. |
| 6,160,036 A | 12/2000 | Kommareddi et al. |
| 6,172,151 B1 | 1/2001 | Johnston et al. |
| 6,178,980 B1 | 1/2001 | Storm |
| 6,218,490 B1 | 4/2001 | Brunelli et al. |
| 6,399,676 B1 | 6/2002 | Labude et al. |
| 6,576,732 B1 | 6/2003 | Smith et al. |
| 6,720,384 B1 | 4/2004 | Mayer et al. |
| 6,723,683 B2 | 4/2004 | Crossman et al. |
| 6,723,779 B2 | 4/2004 | Drujon et al. |
| 6,765,053 B2 | 7/2004 | Labude et al. |
| 6,838,418 B2 | 1/2005 | Allan et al. |
| 6,841,593 B2 | 1/2005 | Kommareddi et al. |
| 6,841,608 B1 | 1/2005 | Dreher et al. |
| 6,851,444 B1 | 2/2005 | Kohl et al. |
| 6,894,088 B2 | 5/2005 | Motier et al. |
| 6,946,500 B2 | 9/2005 | Harris et al. |
| 7,119,132 B2 | 10/2006 | Harris et al. |
| 2002/0065352 A1 | 5/2002 | Johnston et al. |
| 2004/0060703 A1 | 4/2004 | Stegemeier et al. |
| 2004/0112995 A1 | 6/2004 | Harris |
| 2005/0049327 A1 | 3/2005 | Jovancicevic et al. |
| 2005/0209368 A1 | 9/2005 | Yang et al. |
| 2006/0144595 A1 | 7/2006 | Milligan et al. |
| 2006/0148928 A1 | 7/2006 | Harris et al. |
| 2006/0293196 A1 | 12/2006 | Harris et al. |
| 2008/0064785 A1* | 3/2008 | Martin et al. ............... 523/175 |

FOREIGN PATENT DOCUMENTS

| | | |
|---|---|---|
| EP | 0882739 | 12/1998 |
| GB | 1437132 | 5/1973 |
| WO | WO 9957162 | 11/1999 |
| WO | WO 2006/138085 A | 12/2006 |

OTHER PUBLICATIONS

U.S. Patent Application entitled Low-Viscosity Drag Reducer; U.S. Appl. No. 10/411,045, filed Apr. 9, 2003.
Ralph Little, Suzanne Smidt, Paul Huang, James Romans, Joseph Dedrick, and Jan S. Matuszko; Improved Drag Reduction by Control of Polymer Particle Size; American Chemical Society; Ind. Eng. Chem. Res. 1991, 30, 403-407; Washington, D.C.

* cited by examiner

*Primary Examiner*—Edward J Cain

(57) ABSTRACT

A drag reducing composition comprising particles of at least two different drag reducing polymers. The different drag reducing polymers can be formed by different processes, such as bulk polymerization or emulsion polymerization, and the particles of the different drag reducing polymers can have different mean particle sizes. The drag reducing compositions can be added to a hydrocarbon-containing fluid to decrease the pressure drop associated with the turbulent flow of the hydrocarbon-containing fluid through a conduit.

55 Claims, 5 Drawing Sheets

HIGH POLYMER CONTENT HYBRID DRAG REDUCERS

BACKGROUND OF THE INVENTION

1. Field of the Invention

The present invention relates generally to drag reducing compositions comprising at least two different drag reducing polymers. More specifically, the present invention relates to drag reducing compositions comprising at least one drag reducing polymer formed by emulsion polymerization and at least one drag reducing polymer formed by bulk polymerization.

2. Description of the Prior Art

When fluids are transported by a pipeline, a drop in fluid pressure typically occurs due to friction between the wall of the pipeline and the fluid. Due to this pressure drop, for a given pipeline, fluid must be transported with sufficient pressure to achieve a desired throughput. When higher flow rates are desired through the pipeline, more pressure must be applied due to the fact that as flow rates are increased the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducing additives in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of fluid through a pipeline. The role of these additives is to suppress the growth of turbulent eddies, which results in higher flow rate at a constant pumping pressure. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. Effective drag reducing polymers typically have molecular weights in excess of five million.

Some conventional drag reducers are employed in the form of polymer particles suspended in a continuous phase. Most typical drag reducers in this form can only contain up to about 23 weight percent of the drag reducing polymer based on the total weight of the drag reducing composition. Additionally, the efficacy of many drag reducers can be very inconsistent over the distance the flowing fluid travels. Accordingly, there is a need for improved drag reducers containing a higher weight percent of the active ingredient drag reducing polymers and having improved consistency of performance over the length of a pipeline.

SUMMARY OF THE INVENTION

In one embodiment of the present invention, there is provided a drag reducing composition comprising: (a) a continuous phase; (b) a plurality of first particles comprising a first drag reducing polymer dispersed in the continuous phase, wherein the first particles have a mean particle size in the range of from about 100 micrometers to about 700 micrometers; and (c) a plurality of second particles comprising a second drag reducing polymer dispersed in the continuous phase, wherein the second particles have a mean particle size of less than about 10 micrometers.

In another embodiment of the present invention, there is provided a drag reducing composition comprising: (a) a plurality of first particles comprising a polyalphaolefin drag reducing polymer; and (b) a plurality of second particles comprising a non-polyalphaolefin drag reducing polymer, wherein the non-polyalphaolefin drag reducing polymer is formed via emulsion polymerization.

In yet another embodiment of the present invention, there is provided a method for reducing the pressure drop associated with the turbulent flow of a hydrocarbon-containing fluid through a pipeline. The method of this embodiment comprises: (a) introducing a plurality of first particles comprising a first drag reducing polymer and a plurality of second particles comprising a second drag reducing polymer into the hydrocarbon-containing fluid; and (b) flowing the resulting treated hydrocarbon-containing fluid through the pipeline, wherein the first particles have a mean particle size in the range of from about 25 to about 1,500 micrometers, wherein the second particles have a mean particle size of less than about 10 micrometers, wherein the first and second particles are introduced into the hydrocarbon-containing fluid either jointly or separately.

In still another embodiment of the present invention, there is provided a method for producing a drag reducing composition. The method of this embodiment comprises: (a) subjecting one or more monomers to bulk polymerization to thereby produce a first drag reducing polymer; (b) cryogrinding at least a portion of the first drag reducing polymer to thereby produce a plurality of first particles comprising at least a portion of the first drag reducing polymer; (c) subjecting one or more monomers to emulsion polymerization to thereby produce a plurality of second particles comprising a second drag reducing polymer, wherein at least a portion of the second particles are dispersed in a continuous phase; and (d) dispersing at least a portion of the first particles in the continuous phase.

In still yet another embodiment of the present invention, there is provided a method for reducing the pressure drop associated with the turbulent flow of a hydrocarbon-containing fluid through a pipeline. The method of this embodiment comprises: (a) introducing a plurality of first particles comprising a polyalphaolefin drag reducing polymer and a plurality of second particles comprising a non-polyalphaolefin drag reducing polymer into said hydrocarbon-containing fluid; and (b) flowing the resulting treated hydrocarbon-containing fluid through said pipeline, wherein at least a portion of said second particles are formed via emulsion polymerization, wherein said first and second particles are introduced into said hydrocarbon-containing fluid either jointly or separately.

BRIEF DESCRIPTION OF THE DRAWING FIGURES

A preferred embodiment of the present invention is described in detail below with reference to the attached drawing figures, wherein.

Figure 4:
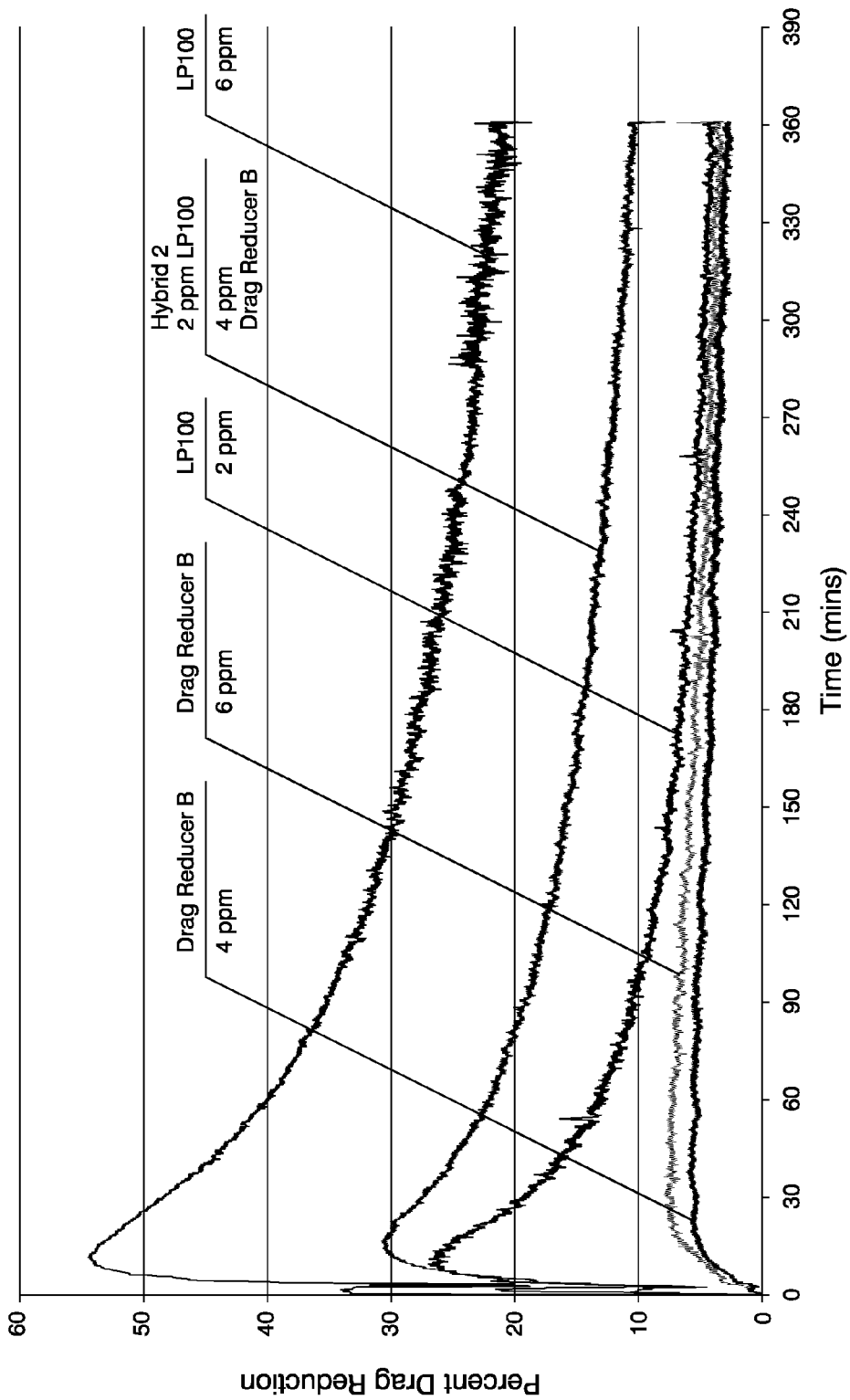
Figure 5:
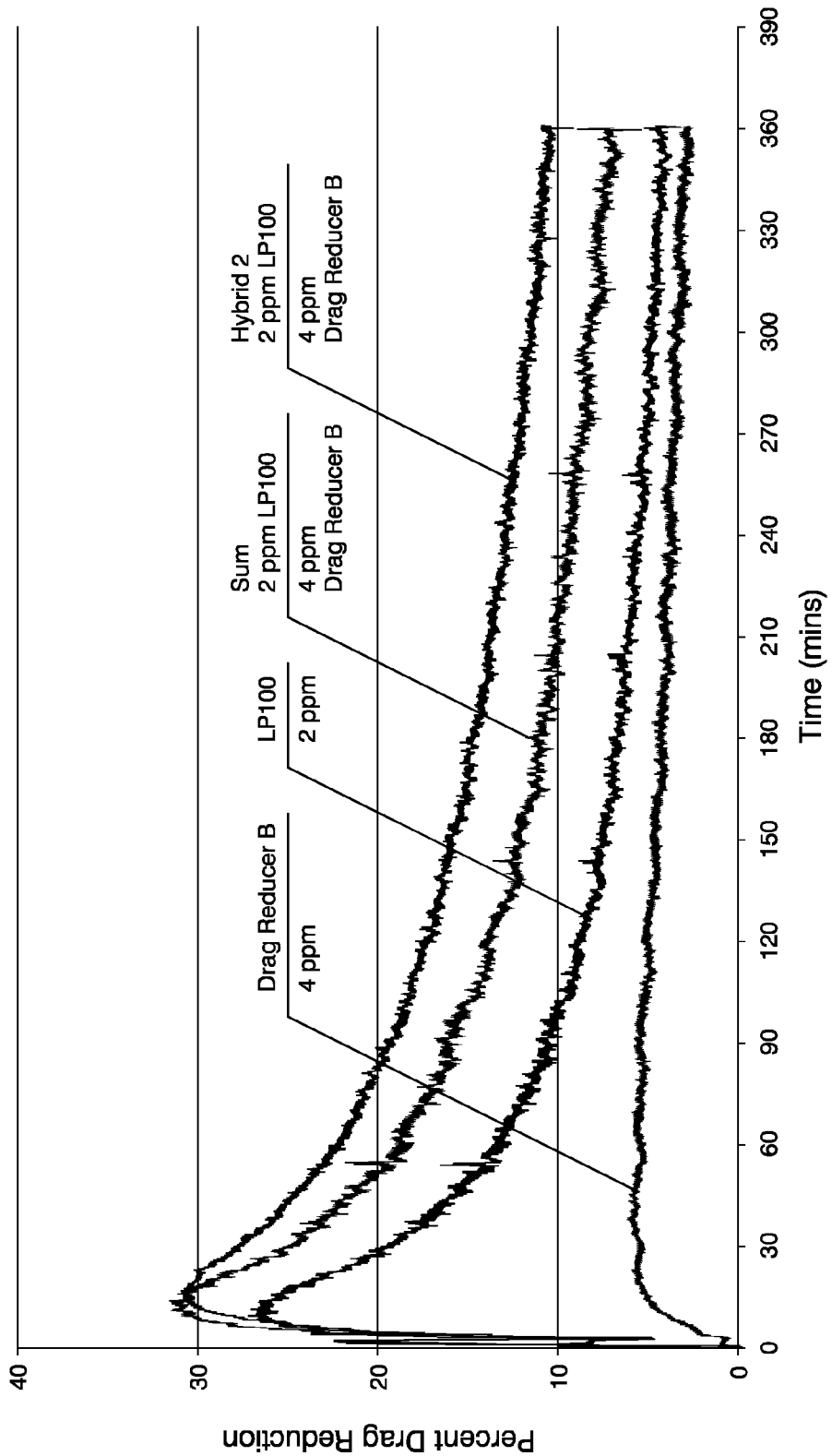

FIG. 4 is a percent drag reduction versus time plot of drag reduction tests performed in the engineering loop re-circulation test apparatus comparing Drag Reducer B, LP 100, and Hybrid 2 at various concentrations; and FIG. 5 is a percent drag reduction versus time plot of drag reduction tests performed in the engineering loop re-circulation test apparatus comparing Drag Reducer B, LP 100, Hybrid 2, and a sum of LP 100 and Drag Reducer B at various concentrations.

DETAILED DESCRIPTION

In accordance with one embodiment of the present invention, a drag reducing composition (i.e., a drag reducer) is provided comprising particles of at least two different drag reducing polymers, where one of the drag reducing polymers comprises at least one monomer residue that is different from all of the monomer residues in the other drag reducing polymer or polymers. The drag reducer of the present invention can be employed to at least partially reduce the pressure drop associated with the turbulent flow of a hydrocarbon-containing fluid through a conduit (e.g., a pipeline).

In one embodiment of the present invention, at least one of the drag reducing polymers in the above-mentioned drag reducing composition can comprise polymer particles formed via bulk polymerization. As used herein, the terms "bulk polymer" and "bulk drag reducing polymer" shall denote any polymer prepared via bulk polymerization. Any bulk polymerization method known in the art can be employed to form a bulk drag reducing polymer useful in the present invention. As used herein, the term "bulk polymerization" is defined as any polymerization method where the polymerization reaction medium primarily contains catalyst and monomer. As used herein, the terms "primarily," "predominately," and "majority" shall mean more than 50 percent.

In one embodiment, the bulk polymerization method can comprise the following steps: (a) creating a reaction medium in a reaction enclosure by combining a polymerization catalyst with a monomer capable of being polymerized to form a desired bulk drag reducing polymer, (b) polymerizing the monomer to produce the bulk drag reducing polymer while removing sufficient heat from the reaction medium in the reaction enclosure to maintain the reaction at a desired temperature, and (c) reducing the obtained bulk polymer to a finely divided state. As used herein, the term "finely divided state" when used to describe a particulate material shall denote an average particle size of less than 2,000 μm.

The monomer of the above-mentioned reaction medium can comprise any monomer or mixture of monomers capable of forming a bulk drag reducing polymer that is ultimately substantially amorphous and hydrocarbon soluble. As used herein, the term "amorphous" shall denote a polymer that is at least partially lacking distinct crystalline structure. In one embodiment, the monomer or monomer mixture can comprise an alphaolefin, such that the resulting bulk drag reducing polymer is a polyalphaolefin. Alphaolefin monomers suitable for use in the present invention can have carbon chain lengths in the range of from 2 to 40 carbons, or in the range of from 4 to 20 carbons. In one embodiment, the polymerization reaction medium can contain at least about 80 weight percent monomer, at least about 90 weight percent monomer, or at least 95 weight percent monomer.

The above-mentioned reaction enclosure can comprise a thin-walled impermeable organic polymer capable of substantially preventing passage of oxygen and water into the reaction enclosure. The reaction enclosure can comprise polymeric bottles and/or bags. The polymeric material of the reaction enclosure can be crystalline and non-soluble in hydrocarbons. Additionally, the polymeric material of the reaction enclosure can be cross-linked. Furthermore, the reaction enclosure can comprise a plurality of layers comprising the same or different polymeric materials. Examples of polymeric materials useful in the reaction enclosures of the present invention include, but are not limited to, water impervious polyolefins, such as polypropylene, polyethylene, polybutylene; ethylene vinyl alcohol copolymers; and polyethylene terephthalate. Ethylene vinyl alcohol is considered to be an excellent oxygen barrier but a poor water barrier, while polyethylene, polypropylene, polybutylene and the like are considered to be excellent water barriers, but may permit the passage of oxygen. Accordingly, in one embodiment, a combination of the above polymers can be employed in the reaction enclosure to ensure both water and oxygen impermeability. Additionally, a bonding polymer, such as, for example, a coextrudable adhesive polymer, can be employed to bind the water impermeable and oxygen impermeable polymer layers together. An example of a commercially available coextrudable adhesive polymer is sold under the name BYNEL by the DuPont Company.

The catalysts employed in the above-described bulk polymerization process can be any one or more olefin polymerization catalyst. In one embodiment, the catalysts can be any Ziegler-Natta catalysts known in the art. In one embodiment, the Ziegler-Natta catalysts can be of the variety discussed in U.S. Pat. Nos. 4,945,142; 4,358,572; 4,371,455; 4,415,714; 4,333,123; 4,493,903; and 4,493,904, the disclosures of which are incorporated herein by reference. In one embodiment, the concentration of the catalysts in the reaction medium can be expressed as a ratio of the number of moles of the transition metal halide in the catalyst to the number of moles of monomer in the reaction medium. Thus, in one embodiment, the catalysts can be present in the reaction medium in a concentration in the range of from about 1 mole of transition metal halide in the catalyst per 10,000 moles of monomer to about 1 mole of transition metal halide in the catalyst per 500 moles of monomer. Additionally, the catalysts can be present in the reaction medium in a concentration in the range of from about 1 mole of transition metal halide in the catalyst per 7,000 moles of monomer to about 1 mole of transition metal halide in the catalyst per 1,000 moles of monomer.

The above-mentioned polymerization of step (b) can be performed by agitating the reaction medium at ambient conditions for a period of time sufficient to increase the viscosity of the reactants and at least partially suspend the catalyst in the reaction medium. Agitation of the reaction medium can be achieved by any means known in the art. The agitated reaction medium can then be placed in a cooling zone where the reaction can be allowed to proceed. The cooling zone can be maintained at any temperature sufficient to remove at least a portion of the heat of reaction from the reaction medium. In one embodiment, the cooling zone can be maintained at a temperature in the range of from about −20° C. to about 100° C., in the range of from about −10° C. to about 90° C., or in the range of from 0° C. to 80° C. The polymerization reaction can be allowed to proceed until a desired yield is achieved. In one embodiment, the bulk polymer content obtained in the reaction enclosure can be at least about 80 weight percent, at least about 90 weight percent, or at least 95 weight percent based on the total weight of the contents of the reaction enclosure.

The bulk polymer obtained by the polymerization of step (b) can have a high molecular weight. An indirect measurement of the molecular weight can be taken by measuring the inherent viscosity (IV) of the resulting bulk polymer, which is measured in hexane at 0.05 g/dL polymer concentration, 25° C., and 300 sec$^{-1}$ shear rate. In one embodiment of the present invention, the resulting bulk polymer can have an IV of at least about 20 deciliters per gram (dL/g), at least about 23 dL/g, or at least 25 dL/g.

Once the desired bulk polymer is obtained, it can be reduced into a finely divided state, as mentioned above. Any technique known in the art for reducing the particle size of a polymer can be employed. In one embodiment, at least a portion of the bulk polymer can be subject to cryogrinding. As used herein, the term "cryogrinding" shall denote any process whereby a polymer is reduced to a finely divided state at cryogenic temperatures. As used herein, the term "cryogenic temperature" shall denote any temperature below the glass transition temperature of the polymer being ground.

In certain cases, the bulk polymer obtained employing the processes of the present invention can become adhered to the inside wall of the reaction enclosure. To prevent yield loss of the bulk polymer, the reaction enclosure can optionally be ground with the obtained bulk polymer.

The temperature of the bulk polymer and optionally the reaction enclosure can be lowered to cryogenic temperatures prior to being reduced to a finely divided state. In one embodiment, the reduction in temperature of the bulk polymer can be obtained by freezing the bulk polymer and optionally the reaction enclosure by contact with liquid nitrogen. The resulting low-temperature bulk polymer can then be introduced into a cold mill and ground to achieve the desired particle size.

Optionally, a coating agent, sometimes referred to as a partitioning agent, can be added to the bulk polymer during grinding to help prevent the freshly exposed surfaces of the polymer from sticking together. Examples of suitable coating agents useful in the present invention include, but are not limited to, alumina, silica, calcined clay, talc, carbon black, calcium stearate, and/or magnesium stearate. The amount of coating agent employed in the grinding process can be less than about 35 weight percent, less than about 30 weight percent, or less than 25 weight percent based on the total weight of the polymer and coating agent.

In one embodiment of the present invention, the resulting finely divided bulk polymer can have a mean particle size in the range of from about 25 to about 1,500 micrometers, in the range of from about 50 to about 1,000 micrometers, or in the range of from 100 to 700 micrometers. As will be discussed in greater detail below, the resulting bulk polymer particles can be dispersed in a continuous phase for use as a drag reducer. In one embodiment, the resulting drag reducer can comprise bulk polymer particles in the form of a suspension in a continuous phase.

Examples of commercially available drag reducers containing bulk-polymerized polyalphaolefin polymers suitable for use in the present invention include, but are not limited to, LIQUIDPOWER 100 (LP 100) and LIQUIDPOWER 300 (LP 300), both available from ConocoPhillips Specialty Products, Inc.

In one embodiment of the present invention, at least one of the drag reducing polymers in the above-mentioned drag reducing composition can comprise polymer particles formed via emulsion polymerization of a reaction mixture comprising one or more monomers, a continuous phase, at least one surfactant, and an initiation system. As used herein, the terms "emulsion polymer" and "emulsion drag reducing polymer" shall denote any polymer prepared via emulsion polymerization.

As discussed in greater detail below, the resulting reaction product of the emulsion polymerization can be in the form of a latex drag reducer composition. The continuous phase of the latex drag reducer composition generally comprises at least one component selected from the group consisting of water, polar organic liquids (e.g., an alcohol comprising one or more hydroxyl groups), and mixtures thereof. When water is the selected constituent of the continuous phase, the reaction mixture can also comprise a buffer. Additionally, as described in more detail below, the continuous phase can optionally comprise a hydrate inhibitor.

In one embodiment of the present invention, the emulsion drag reducing polymer can comprise a plurality of repeating units of the residues of one or more of the monomers selected from the group consisting of:

(A)

wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a —(CH2CH2O)$_x$—$R_4$ or —(CH2CH(CH3)O)$_x$—$R_4$ radical wherein x is in the range of from 1 to 50 and $R_4$ is H, a C1-C30 alkyl radical, or a C6-C30 alkylaryl radical;

(B)

wherein arene is a phenyl, naphthyl, anthracenyl, or phenanthrenyl, $R_3$ is CH=CH$_2$ or CH$_3$—C=CH$_2$, and $R_4$ is H, a C1-C30 alkyl radical, a C5-C30 substituted or unsubstituted cycloalkyl radical, Cl, SO$_3$, OR$_B$, or COOR$_C$, wherein $R_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein $R_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

(C)

wherein $R_5$ is H, a C1-C30 alkyl radical, or a C6-C20 substituted or unsubstituted aryl radical;

(D)

wherein $R_6$ is H, a C1-C30 alkyl radical, or a C6-C20 substituted or unsubstituted aryl radical;

$$\underset{H_2C=C-C=CH_2}{\overset{R_7\ R_8}{|\ \ |}} \quad (E)$$

wherein $R_7$ is H or a C1-C18 alkyl radical, and $R_9$ is H, a C1-C18 alkyl radical, or Cl;

(F) [structure with $R_9O-C(=O)-C(H)=C(H)-C(=O)-OR_{10}$]

wherein $R_9$ and $R_{10}$ are independently H, a C1-C30 alkyl radical, a C6-C20 substituted or unsubstituted aryl radical, a C5-C30 substituted or unsubstituted cycloalkyl radical, or heterocyclic radicals;

(G) [fumarate-type structure with $R_{11}O-C(=O)$ and $-C(=O)-OR_{12}$]

wherein $R_{11}$ and $R_{12}$ are independently H, a C1-C30 alkyl radical, a C6-C20 substituted or unsubstituted aryl radical, a C5-C30 substituted or unsubstituted cycloalkyl radical, or heterocyclic radicals;

(H) [itaconate structure with $R_{13}O-$ and $-OR_{14}$]

wherein $R_{13}$ and $R_{14}$ are independently H, a C1-C30 alkyl radical, a C6-C20 substituted or unsubstituted aryl radical, a C5-C30 substituted or unsubstituted cycloalkyl radical, or heterocyclic radicals;

(I) [maleimide structure with $NR_{15}$]

wherein $R_{15}$ is H, a C1-C30 alkyl radical, a C6-C20 substituted or unsubstituted aryl radical, a C5-C30 substituted or unsubstituted cycloalkyl radical, or heterocyclic radicals;

(J) [vinyl chloride structure]

(K) [vinyl pyridine structures with $R_{16}$]

wherein $R_{16}$ is H, a C1-C30 alkyl radical, or a C6-C20 aryl radical;

(L) [2-chloropropene structure]

(M) [acrylonitrile]

(N) [methacrylonitrile]

(O) [maleic anhydride]

(P) [acrylamide structure with $R_{17}$, $R_{18}$]

wherein $R_{17}$ and $R_{18}$ are independently H, a C1-C30 alkyl radical, a C6-C20 substituted or unsubstituted aryl radical, a C5-C30 substituted or unsubstituted cycloalkyl radical, or heterocyclic radicals; and (Q) [methacrylamide structure with $R_{19}$, $R_{20}$]

wherein $R_{19}$ and $R_{20}$ are independently H, a C1-C30 alkyl radical, a C6-C20 substituted or unsubstituted aryl radical, a C5-C30 substituted or unsubstituted cycloalkyl radical, or heterocyclic radicals.

In one embodiment of the present invention, the emulsion drag reducing polymer can comprise a non-polyalphaolefin drag reducing polymer. Additionally, the emulsion drag reducing polymer can comprise repeating units of the residues of C4-C20 alkyl, C6-C20 substituted or unsubstituted aryl, or aryl-substituted C1-C10 alkyl ester derivatives of methacrylic acid or acrylic acid. In another embodiment, the emulsion drag reducing polymer can be a copolymer comprising repeating units of the residues of 2-ethylhexyl methacrylate and the residues of at least one other monomer. In yet another embodiment, the emulsion drag reducing polymer can be a copolymer comprising repeating units of the residues of 2-ethylhexyl methacrylate monomers and butyl acrylate monomers. In still another embodiment, the emulsion drag reducing polymer can be a homopolymer comprising repeating units of the residues of 2-ethylhexyl methacrylate.

The surfactant used in the above-mentioned reaction mixture can include at least one high HLB anionic or nonionic surfactant. The term "HLB number" refers to the hydrophile-lipophile balance of a surfactant in an emulsion. The HLB number is determined by the methods described by W. C. Griffin in *J. Soc. Cosmet. Chem.*, 1, 311 (1949) and *J. Soc. Cosmet. Chem.*, 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroylsarcosinic (available as HAMPOSYL L-30 from Hampshire Chemical Corp., Lexington, Mass.).

Exemplary high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly(ethyleneoxy)ethanols (available as the IGLPAL CA and CO series, respectively from Rhodia, Cranbury, N.J.), C8 to C18 ethoxylated primary alcohols (such as RHODASURF LA-9 from Rhodia Inc., Cranbury, N.J.), C11 to C15 secondary-alcohol ethoxylates (available as the TERGITOL 15-S series, including 15-S-7, 15-S-9, 15-S-12, from Dow Chemical Company, Midland, Mich.), polyoxyethylene sorbitan fatty acid esters (available as the TWEEN series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON X series, including X-100, X-165, X-305, and X-405, from Dow Chemical Company, Midland, Mich.).

In one embodiment, the initiation system for use in the above-mentioned reaction mixture can be any suitable system for generating free radicals necessary to facilitate emulsion polymerization. Possible initiators include, but are not limited to, persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, erythorbic acid, and sodium formaldehyde sulfoxylate. Possible accelerators include, but are not limited to, any composition containing a transition metal having two oxidation states such as, for example, ferrous sulfate and ferrous ammonium sulfate. Alternatively, known thermal and radiation initiation techniques can be employed to generate the free radicals. In another embodiment, any polymerization and corresponding initiation or catalytic methods known by those skilled in the art may be used in the present invention. For example, when polymerization is performed by methods such as addition or condensation polymerization, the polymerization can be initiated or catalyzed by methods such as cationic, anionic, or coordination methods.

When water is used to form the above-mentioned reaction mixture, the water can be purified water such as distilled or deionized water. However, the continuous phase of the emulsion can also comprise polar organic liquids or aqueous solutions of polar organic liquids, such as those listed below.

As previously noted, the reaction mixture optionally can include a buffer. The buffer can comprise any known buffer that is compatible with the initiation system such as, for example, carbonate, phosphate, and/or borate buffers.

As previously noted, the reaction mixture optionally can include at least one hydrate inhibitor. The hydrate inhibitor can be a thermodynamic hydrate inhibitor such as, for example, an alcohol and/or a polyol. In one embodiment, the hydrate inhibitor can comprise one or more polyhydric alcohols and/or one or more ethers of polyhydric alcohols. Suitable polyhydric alcohols include, but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

Generally, the hydrate inhibitor can be any composition that when mixed with distilled water at a 1:1 weight ratio produces a hydrate inhibited liquid mixture having a gas hydrate formation temperature at 2,000 psia that is lower than the gas hydrate formation temperature of distilled water at 2,000 psia by an amount in the range of from about 10 to about 150° F., in the range of from about 20 to about 80° F., or in the range of from 30 to 60° F. For example, monoethylene glycol qualifies as a hydrate inhibitor because the gas hydrate formation temperature of distilled water at 2,000 psia is about 70° F., while the gas hydrate formation temperature of a 1:1 mixture of distilled water and monoethlylene glycol at 2,000 psia is about 28° F. Thus, monoethylene glycol lowers the gas hydrate formation temperature of distilled water at 2,000 psia by about 42° F. when added to the distilled water at a 1:1 weight ratio. It should be noted that the gas hydrate formation temperature of a particular liquid may vary depending on the compositional make-up of the natural gas used to determine the gas hydrate formation temperature. Therefore, when gas hydrate formation temperature is used herein to define what constitutes a "hydrate inhibitor," such gas hydrate temperature is presumed to be determined using a natural gas composition containing 92 mole percent methane, 5 mole percent ethane, and 3 mole percent propane.

In forming the reaction mixture, the monomer, water, the at least one surfactant, and optionally the hydrate inhibitor, can be combined under a substantially oxygen-free atmosphere that is maintained at less than about 1,000 ppmw oxygen or less than about 100 ppmw oxygen. The oxygen-free atmosphere can be maintained by continuously purging the reaction vessel with an inert gas such as nitrogen and/or argon.

The temperature of the system can be kept at a level from the freezing point of the continuous phase up to about 60° C., in the range of from about 0 to about 45° C., or in the range of from 0 to 30° C. The system pressure can be maintained in the range of from about 5 to about 100 psia, in the range of from about 10 to about 25 psia, or about atmospheric pressure. However, higher pressures up to about 300 psia can be necessary to polymerize certain monomers, such as diolefins.

Next, a buffer can be added, if required, followed by addition of the initiation system, either all at once or over time. The polymerization reaction is carried out for a sufficient amount of time to achieve at least about 90 percent conversion by weight of the monomers. Typically, this time period is in the range of from between about 1 to about 10 hours, or in the range of from 3 to 5 hours. During polymerization, the reaction mixture can be continuously agitated.

The following table sets forth approximate broad and narrow ranges for the amounts of the ingredients present in the reaction mixture.

| Ingredient | Broad Range | Narrow Range |
|---|---|---|
| Monomer (wt. % of reaction mixture) | 10-60% | 30-50% |
| Water (wt. % of reaction mixture) | 20-80% | 50-70% |
| Surfactant (wt. % of reaction mixture) | 0.1-10% | 0.25-6% |
| Initiation system | | |
| Monomer:Initiator (molar ratio) | $1 \times 10^3:1$ - $5 \times 10^6:1$ | $5 \times 10^3:1$ - $2 \times 10^6:1$ |
| Monomer:Reducing Comp. (molar ratio) | $1 \times 10^3:1$ - $5 \times 10^6:1$ | $1 \times 10^4:1$ - $2 \times 10^6:1$ |
| Accelerator:Initiator (molar ratio) | 0.001:1-10:1 | 0.005:1-1:1 |
| Buffer | 0 to amount necessary to reach pH of initiation (initiator dependent, typically between about 6.5-10) | |
| Optional hydrate inhibitor | If present, the hydrate inhibitor can have a hydrate inhibitor-to-water weight ratio from about 1:10 to about 10:1, about 1:5 to about 5:1, or 2:3 to 3:2. | |

The emulsion polymerization reaction yields a latex composition comprising a dispersed phase of solid particles and a liquid continuous phase. The latex can be a stable colloidal dispersion comprising a dispersed phase of high molecular weight polymer particles and a continuous phase comprising water. The colloidal particles can make up in the range of from about 10 to about 60 percent by weight of the latex, or in the range of from 40 to 50 percent by weight of the latex. The continuous phase can comprise water, the high HLB surfactant, the hydrate inhibitor (if present), and buffer as needed. Water can be present in the range of from about 20 to about 80 percent by weight of the latex, or in the range of from about 40 to about 60 percent by weight of the latex. The high HLB surfactant can make up in the range of from about 0.1 to about 10 percent by weight of the latex, or in the range of from 0.25 to 6 percent by weight of the latex. As noted in the table above, the buffer can be present in an amount necessary to reach the pH required for initiation of the polymerization reaction and is initiator dependent. Typically, the pH required to initiate a reaction is in the range of from 6.5 to 10.

When a hydrate inhibitor is employed in the reaction mixture, it can be present in the resulting latex in an amount that yields a hydrate inhibitor-to-water weight ratio in the range of from about 1:10 to about 10:1, in the range of from about 1:5 to about 5:1, or in the range of from 2:3 to 3:2. Alternatively, all or part of the hydrate inhibitor can be added to the latex after polymerization to provide the desired amount of hydrate inhibitor in the continuous phase of the latex.

In one embodiment of the present invention, the emulsion drag reducing polymer of the dispersed phase of the latex can have a weight average molecular weight ($M_w$) of at least about $1 \times 10^6$ g/mol, at least about $2 \times 10^6$ g/mol, or at least $5 \times 10^6$ g/mol. The colloidal particles of the emulsion drag reducing polymer can have a mean particle size of less than about 10 micrometers, less than about 1,000 nm (1 micrometer), in the range of from about 10 to about 500 mm, or in the range of from 50 to 250 nm. At least about 95 percent by weight of the colloidal particles can be larger than about 10 nm and smaller than about 500 nm. At least about 95 percent by weight of the particles can be larger than about 25 nm and smaller than about 250 nm. The continuous phase can have a pH in the range of from about 4 to about 10, or in the range of from about 6 to about 8, and contains few if any multi-valent cations.

As mentioned above, the drag reducing compositions of the present invention can comprise at least two different drag reducing polymers. In one embodiment, the drag reducing composition can comprise particles of the above-described bulk polymer and the above-described emulsion polymer. A drag reducing composition according to the present invention can be formed by dispersing particles of the bulk polymer in the continuous phase of the above-described latex containing particles of the emulsion polymer. The dispersed bulk polymer particles can be in the form of a suspension in the drag reducing composition.

In one embodiment, the drag reducing composition can have a cumulative concentration of all of the drag reducing polymers therein in an amount of at least about 35 weight percent, in the range of from about 40 to about 75 weight percent, or in the range of from 45 to 65 weight percent. Furthermore, the drag reducing composition can comprise the above-described bulk polymer particles in an amount of at least about 5 weight percent, or in the range of from about 10 to about 30 weight percent based on the entire weight of the drag reducing composition. Additionally, the drag reducing composition can comprise the above-described emulsion polymer particles in an amount of at least about 10 weight percent, or in the range of from about 15 to about 50 weight percent based on the entire weight of the drag reducing composition.

In one embodiment, the drag reducing composition of the present invention can comprise the above-mentioned partitioning agent in an amount of less than about 10 weight percent of the drag reducing composition, less than about 5 weight percent, or less than about 2 weight percent. Furthermore, the drag reducing composition can comprise the above-mentioned surfactant in an amount in the range of from about 0.1 to 10 weight percent of the composition, in the range of from 0.25 to 6 weight percent of the composition.

In one embodiment of the present invention, the above-described drag reducing polymers can be added to a hydrocarbon-containing fluid. In one embodiment, the drag reducing polymers can be added to a hydrocarbon-containing fluid jointly in the form of the above-described drag reducing composition. In an alternative embodiment, the drag reducing polymers described above can be added to a hydrocarbon-containing fluid separately. As used herein, the term "separately" as applied to introduction of the drag reducing polymers into a hydrocarbon-containing fluid shall include introduction at the same time in different places, introduction at different times in the same place; and introduction at different times and different places in the hydrocarbon-containing fluid.

The resulting treated hydrocarbon-containing fluid can then be transported through a pipeline. The hydrocarbon-containing fluid can comprise a liquid phase hydrocarbon, a non-liquid phase hydrocarbon, and/or a non-hydrocarbon fluid. In one embodiment, the hydrocarbon-containing fluid can comprise at least about 50 weight percent of a liquid phase hydrocarbon. Additionally, the hydrocarbon-containing fluid can comprise crude oil.

The resulting treated hydrocarbon-containing fluid can comprise a cumulative amount of the drag reducing polymers sufficient to achieve a reduction in drag associated with the turbulent flow of the hydrocarbon-containing fluid through the pipeline. In one embodiment, the treated hydrocarbon-containing fluid can have a cumulative concentration of drag reducing polymers in the range of from about 0.1 to about 500 ppmw, in the range of from about 0.5 to about 200 ppmw, in the range of from about 1 to about 100 ppmw, or in the range of from 2 to 50 ppmw. In one embodiment, at least about 50 weight percent, at least about 75 weight percent, or at least 95 weight percent of the each type of drag reducing polymer particles can be dissolved by the hydrocarbon-containing fluid.

The drag reducers employed in the present invention can provide significant percent drag reduction. For example, the drag reducers can provide at least about 5 percent drag reduction or at least 10 percent drag reduction. Percent drag reduction and the manner in which it is calculated are more fully described in the following Examples.

EXAMPLES

The following examples are intended to be illustrative of the present invention in order to teach one of ordinary skill in the art to make and use the invention and are not intended to limit the scope of the invention in any way.

Test Method

Figure 1:
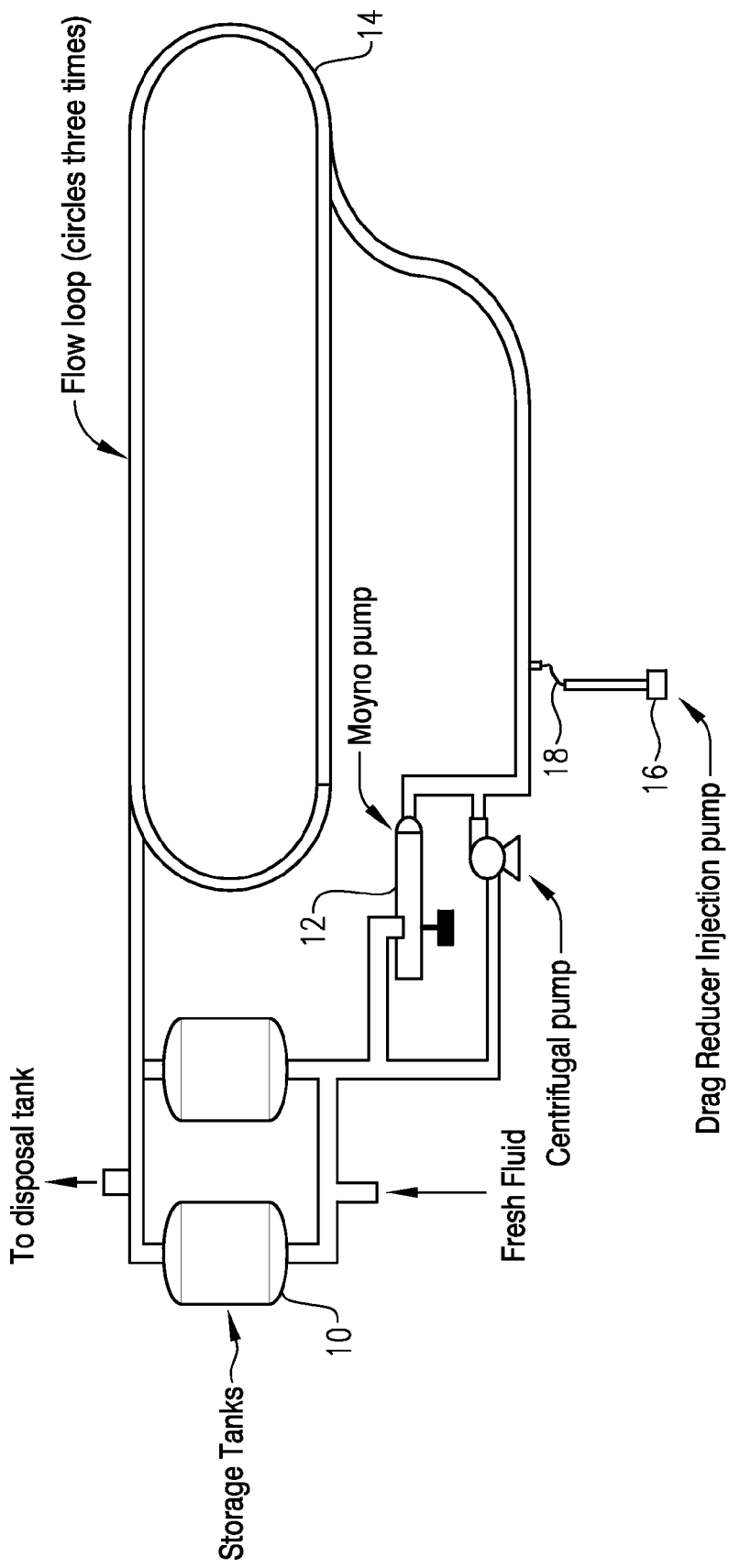
FIG. 1 is a schematic diagram of an engineering loop re-circulation test apparatus used to measure the effectiveness of drag reducers.

In the Examples that follow, the test method described below was used for determining the percent drag reduction in diesel fuel in a 2-inch diameter engineering loop. FIG. 1 depicts an engineering loop recirculation test apparatus suitable for use in the following tests. The diesel fuel used in the test was initially heated to 110° F. by heating diesel storage tank 10 to a temperature of 110° F. For all of the tests described below, the temperature of the diesel fuel was held to 110° F.+/−2° F. for the duration of the test. The level of diesel fuel in storage tank 10 was adjusted to a target level such that the total volume of diesel in loop 14 and storage tank 10 (i.e., the entire engineering loop system) was approximately 600 gallons.

The mixer in storage tank 10 was set at 10 percent (60 rpm) and remained on during the entire test. The purpose of the mixer is to provide effective heat transfer with the cooling/heating jacket (not depicted) on storage tank 10 to maintain the temperature of the diesel fuel throughout the test. Once the diesel fuel in storage tank 10 reached the target temperature, the diesel fuel was allowed to circulate throughout the entire loop. A low-shear Moyno pump 12 was employed to achieve circulation of the diesel fuel. The average flow rate of the diesel fuel through flow loop 14 during each of the following tests was approximately 40.5 gallons per minute. A baseline pressure differential was established for a few minutes prior to introduction of the drag reducer to be tested.

The neat sample drag reducer to be tested was loaded into injection pump 16. After establishing the above-mentioned baseline, the entire sample drag reducer was continuously injected into flow loop 14 over a period of two minutes via tubing 18. Tubing 18 protrudes into the centerline of the 2-inch pipe of flow loop 14. Once the treated diesel fuel returned to storage tank 10, the entire system was homogenous at the target concentration. The concentration of drag reducer in the diesel fuel is test-specific and is provided in more detail below. A differential pressure transmitter (not depicted) on loop 14 measured the pressure differential in one 88 foot segment of loop 14 over a period of 6 hours. After completion of the test, the transmitted data from the differential pressure transmitter was analyzed, corrected for any variations in flow rate, and plotted as percent drag reduction versus time. The results are discussed in detail below.

The percent drag reduction was calculated by the following equation:

$$\% DR = ((\Delta P_{f,base} - \Delta P_{f,treated})/(\Delta P_{f,base})) \times 100\% \quad \text{Equation (1)}$$

where $\% DR$ = the percent drag reduction;

$\Delta P_{f,base}$ = baseline frictional pressure drop with no drag reducer treatment; and $\Delta P_{f,treated}$ = frictional pressure drop with drag reducer treatment.

Percent drag reduction was calculated at each instantaneous measurement point in the test (about once per second). Equation (1) holds true for a constant flow rate. Since flow rate steadily decreases during the test, the baseline frictional pressure drop was corrected to each instantaneous flow rate in order to calculate instantaneous percent drag reduction. This correction was performed by applying the following equation at each measurement point:

$$\Delta P_{f,base}|_Q = (Q/Q_{base})^n \times \Delta P_{f,base} \quad \text{Equation (2)}$$

where $\Delta P_{f,base}|_Q$ = baseline frictional pressure drop at Q;

Q = instantaneous volumetric flow rate;

$Q_{base}$ = average volumetric flow rate at $\Delta P_{f,base}$;

n = logarithmic exponent in the flow rate/pressure drop relationship; and $\Delta P_{f,base}$ = baseline frictional pressure drop.

The n value (logarithmic exponent) was measured to be 1.82, which was the value used in all calculations for each of the tests in the following examples.

In addition to the instantaneous percent drag reduction, the average drag reduction over the entire 6 hour period was calculated for each of the tests in the following examples.

Example 1

Preparation of Drag Reducer Samples

Preparation of Drag Reducer A

Drag Reducer A was prepared by emulsion polymerization employing the following procedure. Polymerization was performed in a 185-gallon stainless steel, jacketed reactor with a mechanical stirrer, thermocouple, feed ports, and nitrogen inlets/outlets. The reactor was charged with 440 lbs of monomer (2-ethylhexyl methacrylate), 567.9 lbs of de-ionized water, 41.4 lbs of Polystep B-5 (surfactant, available from Stepan Company of Northfield, Ill.), 44 lbs of Tergitol 15-S-7 (surfactant, available from Dow Chemical Company of Midland, Mich.), 1.24 lbs of potassium phosphate monobasic (pH buffer), 0.97 lbs of potassium phosphate dibasic (pH buffer), and 33.2 grams of ammonium persulfate, $(NH_4)_2S_2O_8$ (oxidizer).

The monomer and water mixture was agitated at 110 rpm while being purged with nitrogen to remove any traces of oxygen in the reactor and was cooled to about 41° F. The two surfactants were added and the agitation was slowed down to 80 rpm for the remainder of the batch. The buffers and the oxidizer were then added. The polymerization reaction was initiated by adding into the reactor 4.02 grams of ammonium iron(II)sulfate, $Fe(NH_4)_2(SO_4)_2 \cdot 6H_2O$ in a solution of 0.010 M sulfuric acid solution in DI water at a concentration of 1117 ppm at a rate of 5 g/min. The solution was injected for 10 hours to complete the polymerization. The resulting latex was pressured out of the reactor through a 5-micron bag filter and stored.

The resulting drag reducer was a latex containing poly(2-ethylhexyl methacrylate) as the active ingredient. The sample had a solids content of 45.12 percent by mass and a nominal polymer content of 40 percent. The density of the sample was 1.0005 g/mL. The carrier fluid was 100% water.

Preparation of Drag Reducer B

Drag Reducer B was prepared by emulsion polymerization employing the following procedure. Polymerization was performed in a 185-gallon stainless steel, jacketed reactor with a mechanical stirrer, thermocouple, feed ports, and nitrogen inlets/outlets. The reactor was charged with 440 lbs of monomer (2-ethylhexyl methacrylate), 288.9 lbs of de-ionized water, 279.0 lbs of monoethylene glycol, 41.4 lbs of Polystep B-5 (surfactant, available from Stepan Company of Northfield, Ill.), 44 lbs of Tergitol 15-S-7 (surfactant, available from Dow Chemical Company of Midland, Mich.), 1.24 lbs of potassium phosphate monobasic (pH buffer), 0.97 lbs of potassium phosphate dibasic (pH buffer), and 33.2 grams of ammonium persulfate, $(NH_4)_2S_2O_8$ (oxidizer).

The monomer, water, and monoethylene glycol mixture was agitated at 110 rpm while being purged with nitrogen to remove any traces of oxygen in the reactor and was cooled to about 41° F. The two surfactants were added and the agitation was slowed down to 80 rpm for the remainder of the batch. The buffers and the oxidizer were then added. The polymerization reaction was initiated by adding into the reactor 4.02 grams of ammonium iron(II)sulfate, $Fe(NH_4)_2(SO_4)_2 \cdot 6H_2O$ in a solution of 0.010 M sulfuric acid solution in DI water at a concentration of 1117 ppm at a rate of 5 g/min. The solution was injected for 10 hours to complete the polymerization. The resulting latex was pressured out of the reactor through a 5-micron bag filter and stored.

The resulting drag reducer was a latex containing poly(2-ethylhexyl methacrylate) as the active ingredient. The sample had a solids content of 44.85 percent by mass and a nominal polymer content of 40 percent. The density of the sample was 1.0318 g/mL. The carrier fluid was approximately 50% water and 50% monoethylene glycol by mass.

LP 100

LIQUIDPOWER 100 (LP 100) underwent the various tests described below and was compared to the experimental drag reducers of the present invention, Hybrid 1 and Hybrid 2, described below. LP 100 is a drag reducing agent comprising polyalphaolefins. Specifically, LP 100 comprises poly(1-decene). In the following examples, the LP 100 sample employed had a polymer content of 22.69 percent by mass, and a density of 8.06 lbs/gal. LP 100 is commercially available from ConocoPhillips Specialty Products Inc.

Hybrid 1

Hybrid 1 was a physical mixture of LP 100 and Drag Reducer A, both described above. Hybrid 1 comprised a weight ratio of LP 100-to-Drag Reducer A of 1.1345:1, which resulted in a ratio of the active ingredients of 1:2 poly(1-decene)-to-poly(2-ethylhexyl methacrylate) by mass. The total polymer content in Hybrid 1 was 31.91 weight percent. Hybrid 1 was shaken periodically to maintain homogeneity. After shaking, a few drops of antifoam were added to Hybrid 1 to minimize foaming.

Hybrid 2

Hybrid 2 was a physical mixture of LP 100 and Drag Reducer B, both described above. Hybrid 2 comprised a weight ratio of LP 100-to-Drag Reducer B of 1.1345:1, which resulted in a ratio of the active ingredients of 1:2 poly(1-decene)-to-poly(2-ethylhexyl methacrylate) by mass. The total polymer content in Hybrid 2 was 31.91 weight percent. Hybrid 2 was shaken periodically to maintain homogeneity. After shaking, a few drops of antifoam were added to Hybrid 2 to minimize foaming.

Example 2

Determinations of Percent Drag Reduction

Eight tests were performed employing various concentrations of the drag reducers described in Example 1. Table 1 describes the sample compositions employed in each of the eight tests.

TABLE 1

Sample Compositions

| Test Number | Product | Polymer Concentration in Diesel (parts per million) |
|---|---|---|
| 1 | LP 100 | 2 |
| 2 | LP 100 | 6 |
| 3 | Drag Reducer A | 4 |
| 4 | Drag Reducer A | 6 |
| 5 | Drag Reducer B | 4 |
| 6 | Drag Reducer B | 6 |
| 7 | Hybrid 1 | 6* |
| 8 | Hybrid 2 | 6* |

*The 6 ppm total polymer concentration in the flow loop diesel for the Hybrid 1 test consisted of an equivalent of 2 ppm of the polymer found in LP 100 and an equivalent of 4 ppm of the polymer found in Drag Reducer A. Likewise, the 6 ppm total polymer concentration in the flow loop diesel for the Hybrid 2 test consisted of an equivalent of 2 ppm of the polymer found in LP 100 and an equivalent of 4 ppm of the polymer found in Drag Reducer B.

Each of the eight tests was performed according to the Test Method described above in order to determine the percent drag reduction in diesel fuel for each sample listed in Table 1. The results from each of the tests are illustrated in FIGS. 2-5.

Figure 2:
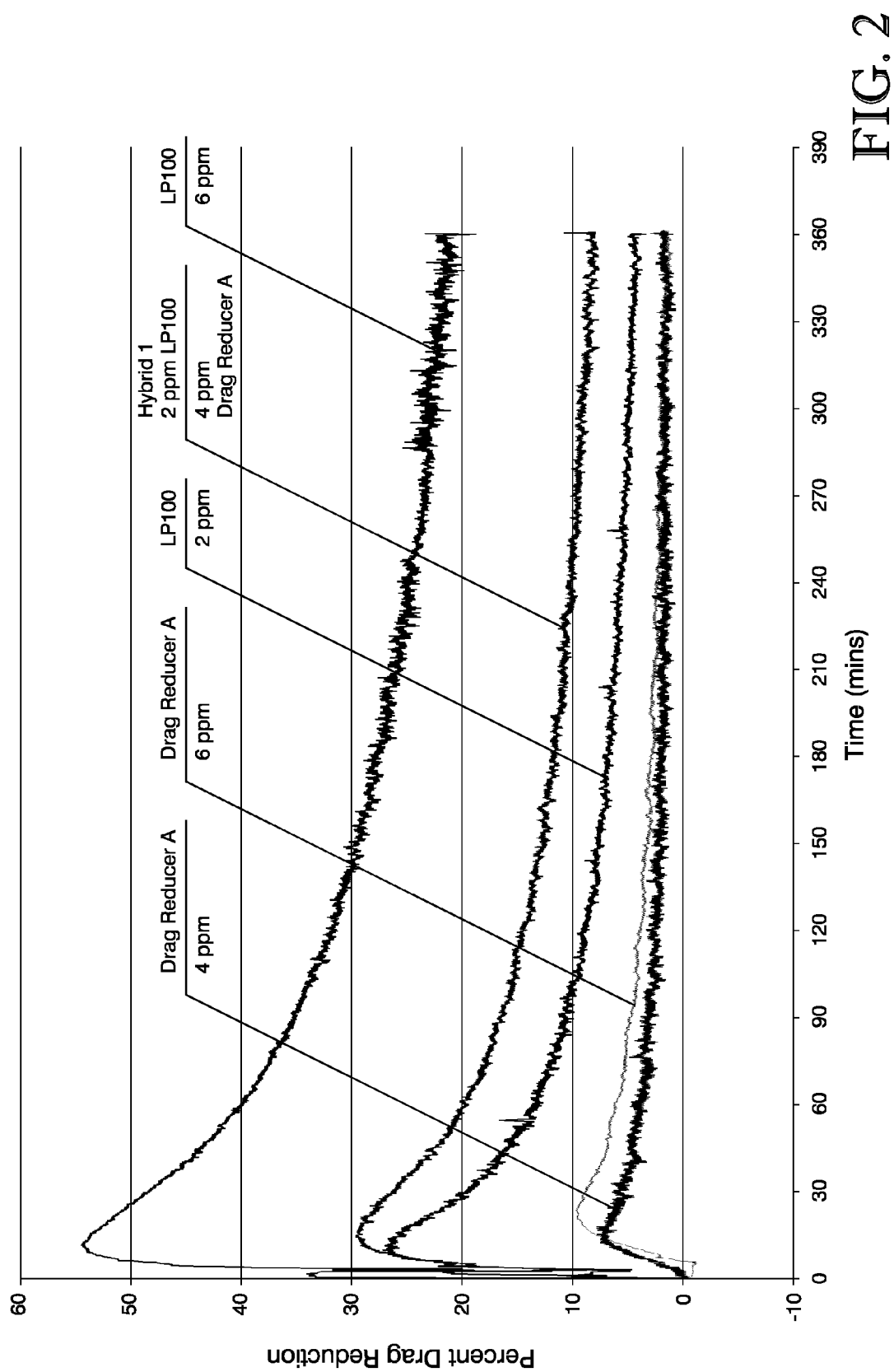
FIG. 2 is a percent drag reduction versus time plot of drag reduction tests performed in the engineering loop re-circulation test apparatus comparing Drag Reducer A, LP 100, and Hybrid 1 at various concentrations.
Figure 3:
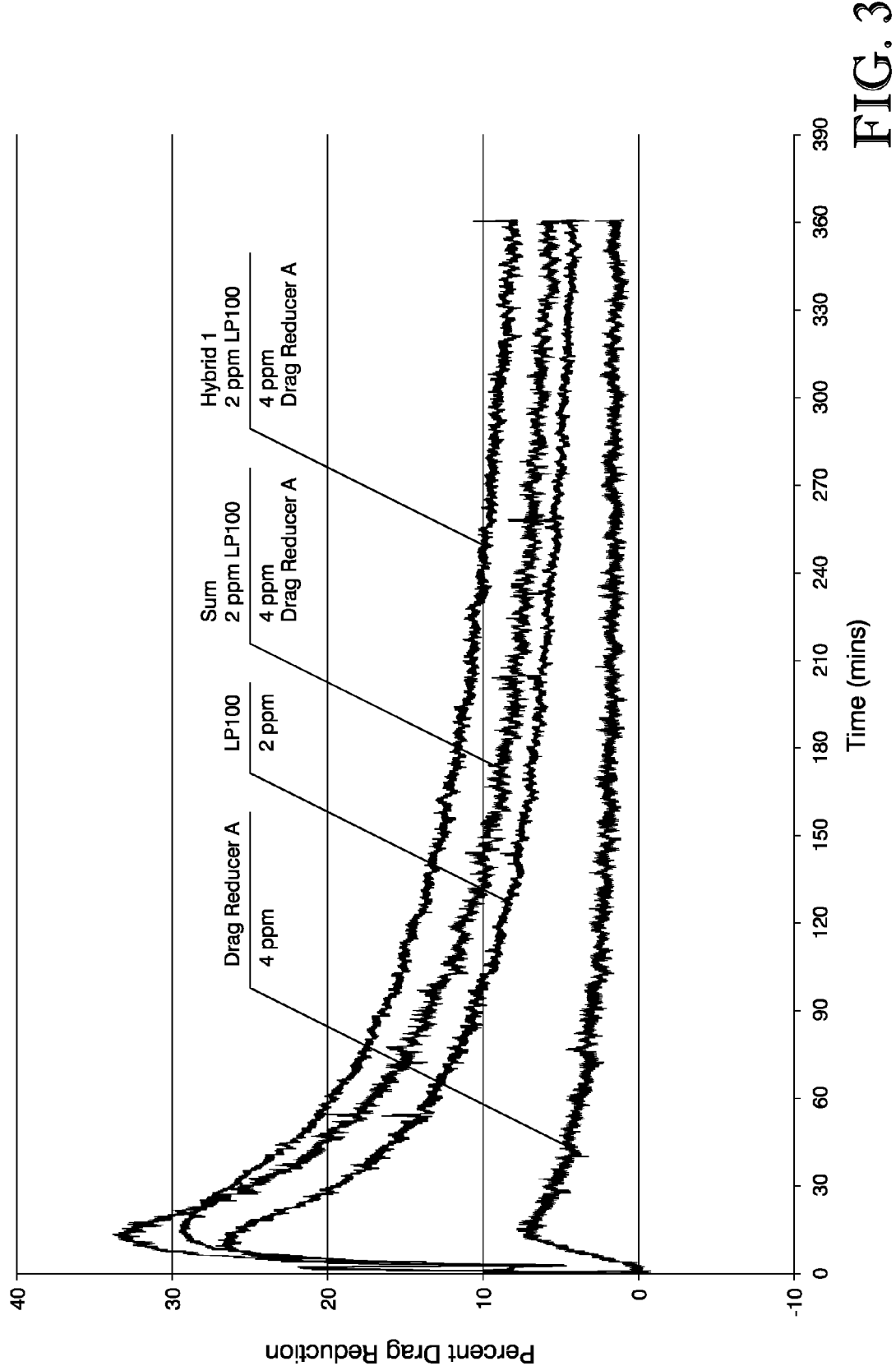
FIG. 3 is a percent drag reduction versus time plot of drag reduction tests performed in the engineering loop re-circulation test apparatus comparing Drag Reducer A, LP 100, Hybrid 1, and a sum of LP100 and Drag Reducer A at various concentrations.

FIG. 2 is a plot of percent drag reduction versus time for test numbers 1, 2, 3, 4, and 7. FIG. 3 is a plot depicting the same test numbers as in FIG. 2, but the results from test numbers 1 and 3 have been added together in order to compare the maximum expected percent drag reduction of the combined samples with the experimental results from test number 7 (Hybrid 1). The average percent drag reduction over the entire 6 hour test was calculated for each test number based on the results displayed in FIG. 2. Additionally, the sum of the average percent drag reduction for runs 1 and 3 was calculated. Table 2 displays the results of these calculations.

TABLE 2

Average Percent Drag Reduction

| Test Number | Product (polymer concentration) | Average 6 hour Percent Drag Reduction |
| --- | --- | --- |
| 1 | LP 100 (2 ppm) | 8.84 |
| 2 | LP 100 (6 ppm) | 30.40 |
| 3 | Drag Reducer A (4 ppm) | 2.41 |
| 4 | Drag Reducer A (6 ppm) | 3.36 |
| Sum of Nos. 1 and 3 | | 11.25 |
| 7 | Hybrid 1 (2 ppm LP 100; 4 ppm Drag Reducer A) | 13.54 |

As can be seen by looking at FIG. 3, test number 7 (Hybrid 1) has an extended "peak" percent drag reduction whereby the most effective drag reduction occurs over a longer period of time when compared to the sum of test numbers 1 and 3. Additionally, as is apparent looking at Table 2, test number 7 (Hybrid 1) has a greater average 6 hour percent drag reduction than the sum of test numbers 1 and 3, despite having polymer concentrations equal to the sum of test numbers 1 and 3. Thus, it appears that a synergistic effect occurs when the two different types of polymers found in LP 100 and Drag Reducer A are combined.

FIG. 4 is a plot of percent drag reduction versus time for test numbers 1, 2, 5, 6, and 8. FIG. 5 is a plot depicting the same test numbers as in FIG. 4, but the results from test numbers 1 and 5 have been added together in order to compare the maximum expected drag reduction of the combined samples with the experimental results from test number 8 (Hybrid 2). The average percent drag reduction over the entire 6 hour test was calculated for each test number based on the results displayed in FIG. 4. Additionally, the sum of the average percent drag reduction for runs 1 and 5 was calculated. Table 3 displays the results of these calculations.

TABLE 3

Average Percent Drag Reduction

| Test Number | Product (polymer concentration) | Average 6 hour Percent Drag Reduction |
| --- | --- | --- |
| 1 | LP 100 (2 ppm) | 8.84 |
| 2 | LP 100 (6 ppm) | 30.40 |
| 5 | Drag Reducer B (4 ppm) | 4.26 |
| 6 | Drag Reducer B (6 ppm) | 5.39 |
| Sum of Nos. 1 and 5 | | 13.10 |
| 8 | Hybrid 2 (2 ppm LP 100; 4 ppm Drag Reducer B) | 16.24 |

As can be seen by looking at FIG. 5, test number 8 (Hybrid 2) has an extended "peak" percent drag reduction whereby the most effective drag reduction occurs over a longer period of time when compared to the sum of test numbers 1 and 5. Additionally, as is apparent looking at Table 3, test number 8 (Hybrid 2) has a greater average 6 hour percent drag reduction than the sum of test numbers 1 and 5, despite having polymer concentrations equal to the sum of test numbers 1 and 5. Thus, as with test number 7 (Hybrid 1) discussed above, it appears that a synergistic effect occurs when the two different types of polymers found in LP 100 and Drag Reducer B are combined.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

CLAIMS NOT LIMITED TO THE DISCLOSED EMBODIMENTS

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A drag reducing composition comprising:
   (a) a continuous phase;
   (b) a plurality of first particles comprising a first drag reducing polymer dispersed in said continuous phase, wherein said first particles have a mean particle size in the range of from about 25 micrometers to about 1,500 micrometers; and
   (c) a plurality of second particles comprising a second drag reducing polymer dispersed in said continuous phase, wherein said second particles have a mean particle size of less than about 10 micrometers;
   wherein said composition has a cumulative concentration of said first and second drag reducing polymers of at least about 35 weight percent.

2. The composition of claim 1, wherein said first particles have a mean particle size in the range of from 100 to 700 micrometers, wherein said second particles have a mean particle size in the range of from 10 to 500 nanometers.

3. The composition of claim 1, wherein said composition has a cumulative concentration of said first and second drag reducing polymers in the range of from about 40 to about 75 weight percent.

4. The composition of claim 1, wherein said composition has a concentration of said first drag reducing polymer in the range of from about 10 to about 30 weight percent.

5. The composition of claim 1, wherein said composition has a concentration of said second drag reducing polymer in the range of from about 15 to about 50 weight percent.

6. The composition of claim 1, wherein at least a portion of said first particles are formed from a polymer made by bulk polymerization.

7. The composition of claim 1, wherein at least a portion of said second particles are formed via emulsion polymerization.

8. The composition of claim 1, wherein said first drag reducing polymer comprises at least one monomer residue that is different from all of the monomer residues in said second drag reducing polymer.

9. The composition of claim 1, wherein said first drag reducing polymer is a polyalphaolefin polymer and said second drag reducing polymer is a non-polyalphaolefin polymer.

10. The composition of claim 1, wherein said first drag reducing polymer comprises repeating units of the residues of one or more alphaolefin monomers having from 2 to 40 carbon atoms.

11. The composition of claim 1, wherein said second drag reducing polymer comprises residue repeating units from one or more of the monomers selected from the group consisting of:

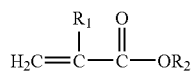
(A)

wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a —(CH2CH2O)$_x$—$R_A$ or —(CH2CH(CH3)O)$_x$—$R_A$ radical wherein x is in the range of from 1 to 50 and $R_A$ is H, a C1-C30 alkyl radical, or a C6-C30 alkylaryl radical;

$R_3$-arene-$R_4$  (B)

wherein arene is a phenyl, naphthyl, anthracenyl, or phenanthrenyl, $R_3$ is CH=CH$_2$ or CH$_3$—C=CH$_2$, and $R_4$ is H, a C1-C30 alkyl radical, a C5-C30 substituted or unsubstituted cycloalkyl radical, Cl, SO$_3$, OR$_B$, or COOR$_C$, wherein $R_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein $R_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

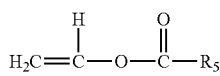
(C)

wherein $R_5$ is H, a C1-C30 alkyl radical, or a C6-C20 substituted or unsubstituted aryl radical;

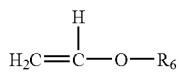
(D)

wherein $R_6$ is H, a C1-C30 alkyl radical, or a C6-C20 substituted or unsubstituted aryl radical;

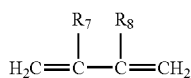
(E)

wherein $R_7$ is H or a C1-C18 alkyl radical, and $R_8$ is H, a C1-C18 alkyl radical, or Cl;

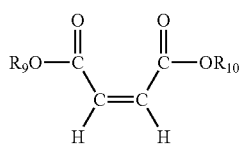
(F)

wherein $R_9$ and $R_{10}$ are independently H, a C1-C30 alkyl radical, a C6-C20 substituted or unsubstituted aryl radical, a C5-C30 substituted or unsubstituted cycloalkyl radical, or heterocyclic radicals;

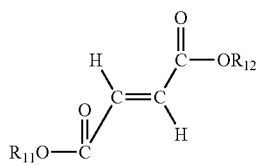
(G)

wherein $R_{11}$ and $R_{12}$ are independently H, a C1-C30 alkyl radical, a C6-C20 substituted or unsubstituted aryl radical, a C5-C30 substituted or unsubstituted cycloalkyl radical, or heterocyclic radicals;

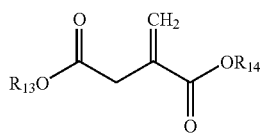
(H)

wherein $R_{13}$ and $R_{14}$ are independently H, a C1-C30 alkyl radical, a C6-C20 substituted or unsubstituted aryl radical, a C5-C30 substituted or unsubstituted cycloalkyl radical, or heterocyclic radicals;

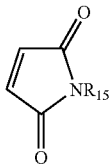
(I)

wherein $R_{15}$ is H, a C1-C30 alkyl radical, a C6-C20 substituted or unsubstituted aryl radical, a C5-C30 substituted or unsubstituted cycloalkyl radical, or heterocyclic radicals;

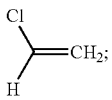
(J)

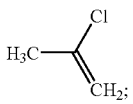
(K)

wherein $R_{16}$ is H, a C1-C30 alkyl radical, or a C6-C20 aryl radical;

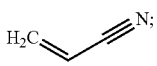
(L)

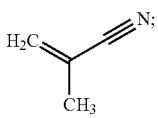
(M)

(N)

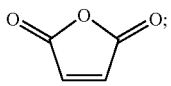
(O)

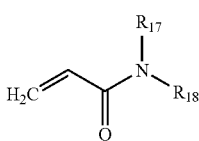
(P)

wherein $R_{17}$ and $R_{18}$ are independently H, a C1-C30 alkyl radical, a C6-C20 substituted or unsubstituted aryl radical, a C5-C30 substituted or unsubstituted cycloalkyl radical, or heterocyclic radicals; and

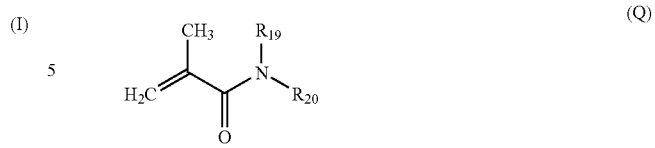
(Q)

wherein $R_{19}$ and $R_{20}$ are independently H, a C1-C30 alkyl radical, a C6-C20 substituted or unsubstituted aryl radical, a C5-C30 substituted or unsubstituted cycloalkyl radical, or heterocyclic radicals.

12. The composition of claim 1, wherein said second drag reducing polymer comprises repeating units of the residues of C4-C20 alkyl, C6-C20 substituted or unsubstituted aryl, or aryl-substituted C1-C10 alkyl ester derivatives of methacrylic acid or acrylic acid monomers.

13. The composition of claim 1, wherein said drag reducing polymer comprises repeating units of the residues of 2-ethylhexyl methacrylate monomers and/or the residues of butyl acrylate monomers.

14. The composition of claim 1, wherein said second drag reducing polymer has a weight average molecular weight of at least about $1 \times 10^6$ g/mol.

15. The composition of claim 1, wherein said first drag reducing polymer has an inherent viscosity of at least about 20 dL/g measured in hexane at 0.05 g/dL polymer concentration, 25° C., and 300 sec$^{-1}$ shear rate.

16. A drag reducing composition comprising:
(a) a plurality of first particles comprising a polyalphaolefin drag reducing polymer; and
(b) a plurality of second particles comprising a non-polyalphaolefin drag reducing polymer, wherein at least a portion of said second particles are formed via emulsion polymerization;
wherein said composition has a cumulative concentration of said polyalphaolefin drag reducing polymer and said non-polyalphaolefin drag reducing polymer of at least about 35 weight percent.

17. The composition of claim 16, wherein said composition has a concentration of said polyalphaolefin drag reducing polymer in the range of from about 10 to about 30 weight percent.

18. The composition of claim 16, wherein said composition has a concentration of said non-polyalphaolefin drag reducing polymer in the range of from about 15 to about 50 weight percent.

19. The composition of claim 16, wherein said first particles have a mean particle size in the range of from about 25 to about 1,500 micrometers, wherein said second particles have a mean particle size of less than about 10 micrometers.

20. The composition of claim 16, wherein said first particles have a mean particle size in the range of from 100 to 700 micrometers, wherein said second particles have a mean particle size in the range of from 10 to 500 nanometers.

21. The composition of claim 16, wherein at least a portion of said first particles are formed from a polymer made by bulk polymerization.

22. The composition of claim 16, wherein said polyalphaolefin drag reducing polymer comprises repeating units of the residues of one or more alphaolefin monomers having from 2 to 40 carbon atoms.

23. The composition of claim 16, wherein said non-polyalphaolefin drag reducing polymer comprises repeating units of the residues of C4-C20 alkyl, C6-C20 substituted or unsubstituted aryl, or aryl-substituted C1-C10 alkyl ester derivatives of methacrylic acid or acrylic acid monomers.

24. The composition of claim 16, wherein said non-polyalphaolefin drag reducing polymer comprises repeating units of the residues of 2-ethylhexyl methacrylate monomers and/or the residues of butyl acrylate monomers.

25. The composition of claim 16, further comprising a continuous phase comprising water and/or alcohol, wherein said alcohol comprises one or more hydroxyl groups, wherein said first and second particles are dispersed in said continuous phase.

26. A method for reducing the pressure drop associated with the turbulent flow of a hydrocarbon-containing fluid through a pipeline, said method comprising:
  (a) introducing a plurality of first particles comprising a first drag reducing polymer and a plurality of second particles comprising a second drag reducing polymer into said hydrocarbon-containing fluid; and
  (b) flowing the resulting treated hydrocarbon-containing fluid through said pipeline, wherein said first particles have a mean particle size in the range of from about 25 to about 1,500 micrometers, wherein said second particles have a mean particle size of less than about 10 micrometers, wherein said first and second particles are introduced into said hydrocarbon-containing fluid either jointly or separately;
wherein said first and second particles are introduced into said hydrocarbon-containing fluid jointly as a drag reducing composition, wherein said composition has a cumulative concentration of said first and second drag reducing polymers of at least about 35 weight percent.

27. The method of claim 26, wherein said first particles have a mean particle size in the range of from 100 to 700 micrometers, wherein said second particles have a mean particle size in the range of from 10 to 500 nanometers.

28. The method of claim 26, wherein said composition has a concentration of said first drag reducing polymer in the range of from about 10 to about 30 weight percent, wherein said composition has a concentration of said second drag reducing polymer in the range of from about 15 to about 50 weight percent.

29. The method of claim 26, wherein said composition further comprises a continuous phase, wherein said first and second particles are dispersed in said continuous phase prior to introduction into said hydrocarbon-containing fluid.

30. The method of claim 26, wherein at least a portion of said first particles are formed via bulk polymerization, wherein at least a portion of said second particles are formed via emulsion polymerization.

31. The method of claim 26, wherein said first drag reducing polymer is a polyalphaolefin polymer and said second drag reducing polymer is a non-polyalphaolefin polymer.

32. The method of claim 26, wherein said first drag reducing polymer comprises repeating units of the residues of one or more alphaolefin monomers having from 4 to 20 carbon atoms.

33. The method of claim 26, wherein said second drag reducing polymer comprises repeating units of the residues of C4-C20 alkyl, C6-C20 substituted or unsubstituted aryl, or aryl-substituted C1-C10 alkyl ester derivatives of methacrylic acid or acrylic acid monomers.

34. The method of claim 26, wherein said second drag reducing polymer comprises repeating units of the residues of 2-ethylhexyl methacrylate monomers and/or the residues of butyl acrylate monomers.

35. The method of claim 26, wherein said treated hydrocarbon-containing fluid has a cumulative concentration of said first and said second drag reducing polymers in the range of from about 0.1 to about 500 ppmw.

36. The method of claim 26, wherein said hydrocarbon-containing fluid comprises a liquid phase hydrocarbon, a non-liquid phase hydrocarbon, and/or a non-hydrocarbon fluid, wherein said hydrocarbon-containing fluid comprises at least about 50 weight percent of said liquid phase hydrocarbon.

37. The method of claim 26, wherein said hydrocarbon-containing fluid comprises crude oil.

38. A method for producing a drag reducing composition, said method comprising:
  (a) subjecting one or more monomers to bulk polymerization to thereby produce a first drag reducing polymer;
  (b) cryogrinding at least a portion of said first drag reducing polymer to thereby produce a plurality of first particles comprising at least a portion of said first drag reducing polymer;
  (c) subjecting one or more monomers to emulsion polymerization to thereby produce a plurality of second particles comprising a second drag reducing polymer, wherein at least a portion of said second particles are dispersed in a continuous phase; and
  (d) dispersing at least a portion of said first particles in said continuous phase;
wherein said composition has a concentration of said first drag reducing polymer in the range of from about 10 to about 30 weight percent, wherein said composition has a concentration of said second drag reducing polymer in the range of from about 15 to about 50 weight percent.

39. The method of claim 38, wherein said composition has a cumulative concentration of said first and second drag reducing polymers of at least about 35 weight percent.

40. The method of claim 38, wherein said first particles have a mean particle size in the range of from about 25 to about 1,500 micrometers, wherein said second particles have a mean particle size of less than about 10 micrometers.

41. The method of claim 38, wherein said first particles have a mean particle size in the range of from 100 to 700 micrometers, wherein said second particles have a mean particle size in the range of from 10 to 500 nanometers.

42. The method of claim 38, wherein said continuous phase comprises water and/or alcohol, wherein said alcohol comprises one or more hydroxyl groups.

43. The method of claim 38, wherein said monomers of step (a) comprise one or more alphaolefin monomers having from 2 to 40 carbon atoms.

44. The method of claim 38, wherein said monomers of step (a) comprise one or more alphaolefin monomers having from 4 to 20 carbon atoms.

45. The method of claim 38, wherein said monomers of step (c) comprise one or more monomers selected from the group consisting of:

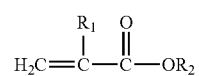

(A)

wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a $-(CH_2CH_2O)_x-R_A$ or $-(CH_2CH(CH_3)$ O)$_x$—R$_A$ radical wherein x is in the range of from 1 to 50 and R$_A$ is H, a C1-C30 alkyl radical, or a C6-C30 alkylaryl radical;

R$_3$-arene-R$_4$ (B)

wherein arene is a phenyl, naphthyl, anthracenyl, or phenanthrenyl, R$_3$ is CH=CH$_2$ or CH$_3$—C=CH$_2$, and R$_4$ is H, a C1-C30 alkyl radical, a C5-C30 substituted or unsubstituted cycloalkyl radical, Cl, SO$_3$, OR$_B$, or COOR$_C$, wherein R$_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein R$_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

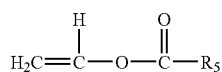 (C)

wherein R$_5$ is H, a C1-C30 alkyl radical, or a C6-C20 substituted or unsubstituted aryl radical;

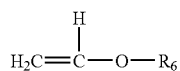 (D)

wherein R$_6$ is H, a C1-C30 alkyl radical, or a C6-C20 substituted or unsubstituted aryl radical;

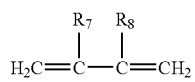 (E)

wherein R$_7$ is H or a C1-C18 alkyl radical, and R$_8$ is H, a C1-C18 alkyl radical, or Cl;

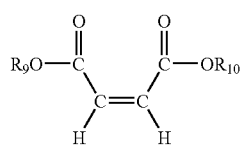 (F)

wherein R$_9$ and R$_{10}$ are independently H, a C1-C30 alkyl radical, a C6-C20 substituted or unsubstituted aryl radical, a C5-C30 substituted or unsubstituted cycloalkyl radical, or heterocyclic radicals;

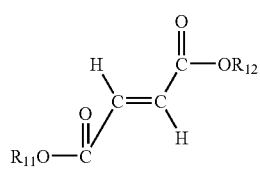 (G)

wherein R$_{11}$ and R$_{12}$ are independently H, a C1-C30 alkyl radical, a C6-C20 substituted or unsubstituted aryl radical, a C5-C30 substituted or unsubstituted cycloalkyl radical, or heterocyclic radicals;

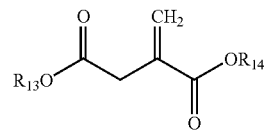 (H)

wherein R$_{13}$ and R$_{14}$ are independently H, a C1-C30 alkyl radical, a C6-C20 substituted or unsubstituted aryl radical, a C5-C30 substituted or unsubstituted cycloalkyl radical, or heterocyclic radicals;

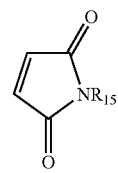 (I)

wherein R$_{15}$ is H, a C1-C30 alkyl radical, a C6-C20 substituted or unsubstituted aryl radical, a C5-C30 substituted or unsubstituted cycloalkyl radical, or heterocyclic radicals;

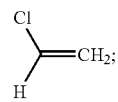 (J)

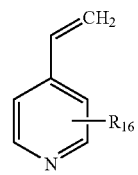 (K)

wherein R$_{16}$ is H, a C1-C30 alkyl radical, or a C6-C20 aryl radical;

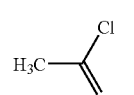 (L)

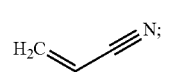 (M)

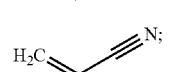 (N)

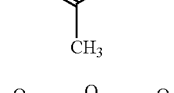 (O)

-continued

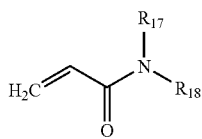

(P)

wherein $R_{17}$ and $R_{18}$ are independently H, a C1-C30 alkyl radical, a C6-C20 substituted or unsubstituted aryl radical, a C5-C30 substituted or unsubstituted cycloalkyl radical, or heterocyclic radicals; and

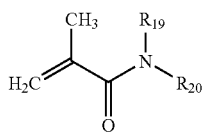

(Q)

wherein $R_{19}$ and $R_{20}$ are independently H, a C1-C30 alkyl radical, a C6-C20 substituted or unsubstituted aryl radical, a C5-C30 substituted or unsubstituted cycloalkyl radical, or heterocyclic radicals.

46. The method of claim 38, wherein said monomers of step (c) comprise one or more of C4-C20 alkyl, C6-C20 substituted or unsubstituted aryl, or aryl-substituted C1-C10 alkyl ester derivatives of methacrylic acid or acrylic acid.

47. A method for reducing the pressure drop associated with the turbulent flow of a hydrocarbon-containing fluid through a pipeline, said method comprising:
(a) introducing a plurality of first particles comprising a polyalphaolefin drag reducing polymer and a plurality of second particles comprising a non-polyalphaolefin drag reducing polymer into said hydrocarbon-containing fluid; and
(b) flowing the resulting treated hydrocarbon-containing fluid through said pipeline, wherein at least a portion of said second particles are formed via emulsion polymerization, wherein said first and second particles are introduced into said hydrocarbon-containing fluid either jointly or separately;
wherein said first and second particles are introduced into said hydrocarbon-containing fluid jointly as a drag reducing composition, wherein said composition has a cumulative concentration of said polyalphaolefin and non-polyalphaolefin drag reducing polymers of at least about 35 weight percent.

48. The method of claim of claim 47, wherein said first particles have a mean particle size in the range of from about 25 to about 1,500 micrometers, wherein said second particles have a mean particle size of less than about 10 micrometers.

49. The method of claim 47, wherein said first particles have a mean particle size in the range of from 100 to 700 micrometers, wherein said second particles have a mean particle size in the range of from 10 to 500 nanometers.

50. The method of claim 47, wherein said composition has a concentration of said polyalphaolefin drag reducing polymer in the range of from about 10 to about 30 weight percent, wherein said composition has a concentration of said non-polyalphaolefin drag reducing polymer in the range of from about 15 to about 50 weight percent.

51. The method of claim 47, wherein said composition further comprises a continuous phase, wherein said first and second particles are dispersed in said continuous phase prior to introduction into said hydrocarbon-containing fluid.

52. The composition of claim 47, wherein at least a portion of said first particles are formed via bulk polymerization, wherein said polyalphaolefin drag reducing polymer comprises repeating units of the residues of one or more alpha-olefin monomers having from 2 to 40 carbon atoms.

53. The composition of claim 47, wherein said non-polyalphaolefin drag reducing polymer comprises repeating units of the residues of C4-C20 alkyl, C6-C20 substituted or unsubstituted aryl, or aryl-substituted C1-C10 alkyl ester derivatives of methacrylic acid or acrylic acid monomers.

54. The method of claim 47, wherein said treated hydrocarbon-containing fluid has a cumulative concentration of said polyalphaolefin and non-polyalphaolefin drag reducing polymers in the range of from about 0.1 to about 500 ppmw.

55. The method of claim 47, wherein said hydrocarbon-containing fluid comprises a liquid phase hydrocarbon, a non-liquid phase hydrocarbon, and/or a non-hydrocarbon fluid, wherein said hydrocarbon-containing fluid comprises at least about 50 weight percent of said liquid phase hydrocarbon.

* * * * *